United States Patent [19]
Mori

[11] 3,883,882
[45] May 13, 1975

[54] ELECTRIC SHUTTER CONTROL CIRCUIT FOR SINGLE LENS REFLEX CAMERAS

[75] Inventor: Chiharu Mori, Tokyo, Japan

[73] Assignee: Asahi Kogaku Kogyo Kabushiki Kaisha, Tokyo, Japan

[22] Filed: Oct. 10, 1972

[21] Appl. No.: 296,038

[30] Foreign Application Priority Data
Oct. 14, 1971   Japan.................................. 46-81143

[52] U.S. Cl. ...................... 354/51; 354/24; 354/50; 354/60 R
[51] Int. Cl. ............................................. G03n 7/08
[58] Field of Search ........ 95/10 CT; 354/24, 50, 51, 354/60 R

[56] References Cited
UNITED STATES PATENTS

| | | | |
|---|---|---|---|
| 3,625,124 | 12/1971 | Miyakawa.......................... | 95/10 CT |
| 3,641,890 | 2/1972 | Ono................................. | 95/10 CT |
| 3,670,637 | 6/1972 | Movi et al. ....................... | 95/10 CT |
| 3,678,826 | 7/1972 | Mori................................. | 95/10 CT |
| 3,690,230 | 9/1972 | Mori et al.......................... | 95/10 CT |
| 3,695,157 | 10/1972 | Miyakawa.......................... | 95/10 CT |

OTHER PUBLICATIONS
Hart et al., "An All-Silicon Timing Circuit For Automatic Cameras," *Microelectronics & Reliability*, Pergamon Press, 1970, Vol. 9, No. 4, pp. 335–340.

*Primary Examiner*—Samuel S. Matthews
*Assistant Examiner*—Russell E. Adams, Jr.
*Attorney, Agent, or Firm*—Christie, Parker & Hale

[57] ABSTRACT

An electric shutter control circuit for a single lens reflex camera has first and second circuit sections, each with a transistor having emitter, collector and base circuits, and a constant-voltage source coupled to the emitter-collector circuit of the transistor. The constant-voltage source has a serially connected variable resistor and means for providing a logarithmic function output and an operational amplifier is coupled to the logarithmic function output for providing the constant-voltage output. Means is provided for biasing the base circuit of the transistors. Current controlling photosensitive means are coupled to the emitter-collector circuit of the transistor in the first circuit section for controlling current through such transistor. A capacitor is coupled to the emitter-collector circuit of the transistor in the second circuit section, enabling the transistor to provide a constant current charge to the capacitor.

9 Claims, 3 Drawing Figures 3,883,882

ELECTRIC SHUTTER CONTROL CIRCUIT FOR SINGLE LENS REFLEX CAMERAS

BACKGROUND OF THE INVENTION

The present invention relates to an electric shutter control circuit for single lens reflex cameras.

In conventional electric shutter control circuits for single lens reflex cameras, photoconductor elements such as CdS elements have been utilized for light receiving elements. As a result, the response characteristic is very low, especially when the light input intensity from the object is small and it takes considerable time for the internal resistance of the photoconductor element to reach the stationary value. Also, the operation is apt to be influenced by hysteresis effect and ambient temperature. Accordingly, accurate light measurement has been difficult.

There has been proposed a circuit system containing the fundamental processes of logarithmic compression, photographic computation and logarithmic expansion. In constructing an embodiment of such a system, however, it is necessary to give due consideration with respect especially to source voltage dependency and temperature dependency. The non-uniformity of the characteristics of the circuit elements exerts influence on the stability of the circuit system and accordingly also greatly raises difficulties in manufacture.

SUMMARY OF THE INVENTION

An embodiment of the present invention provides a highly accurate electric shutter control circuit for single lens reflex cameras in which all of the above-mentioned defects are eliminated and highly stabilized operation can be carried out independent of source voltage variation and ambient temperature variation.

The electric shutter control circuit for a single lens reflex camera embodying the present invention includes first and second circuit sections, each having a transistor with emitter, collector and base electrode circuits and a constant voltage source coupled to the emitter-collector circuit of the transistor. The constant-voltage source has a serially connected variable resistor, means for providing a logarithmic function output, and an operational amplifier coupled to the logarithmic function output for providing the constant-voltage output. Means is provided for biasing the base circuit of the transistors. A current-controlling photosensitive means is coupled to the emitter-collector circuit of the transistor in the first circuit section for controlling current through such transistor. A capacitor is coupled to the emitter-collector circuit of the transistor in the second circuit section enabling such transistor to provide a constant-current charge to the capacitor. Preferably, the bias means is a circuit having an input and output. The circuit is characterized by a high input impedance at the input and the input is coupled to the emitter-collector circuit and the output is coupled to the base circuit of the transistor in the first circuit. The last named circuit includes a storage means for retaining the signal on the base of the transistor in the first circuit section and thereby maintains a constant collector current. Preferably, the output of the last named circuit is also coupled to the base circuit of the transistor in the second circuit section In a preferred embodiment, the last named circuit includes a circuit for disconnecting the storage means from the collector circuit of the connected transistor when a photographing operation takes place.

DESCRIPTION OF THE PREFERRED EMBODIMENT

Figure 1:
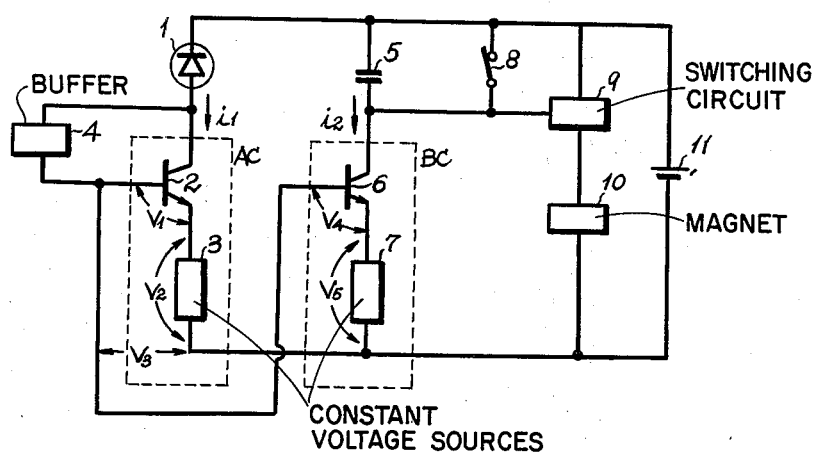
FIG. 1 is a circuit diagram showing the fundamental structure of an electric shutter control circuit according to the present invention.

FIG. 1 is a block and schematic diagram showing the fundamental circuit structure of the present invention and includes the following: A light receiving element 1, such as a photo-diode, whose photoelectric transformation characteristic is of constant-current nature; a transistor 2 for producing a current which is equal to the photocurrent obtained by the light receiving element 1, the bias current of the transistor 2 being supplied from the collector to the base through a buffer circuit 4; and a constant-voltage source 3 whose voltage value is established in response to the values of such exposure determining factors as lens diaphragm aperture and film sensitivity. The buffer circuit 4 is of high input resistance type and has retaining function which will be described hereinafter.

Generally, an electric shutter control circuit for internally light receiving type single lens reflex cameras must exercise the retaining function for retaining the light measurement value for the time interval from immediately before mirror swing-up operation until the time of completion of shutter action.

FIG. 1 shows two circuit sections indicated by broken lines, a circuit section AC consisting of the transistor 2 and the constant-voltage source 3 and another circuit section BC consisting of a transistor 6 and a constant-voltage source 7. The numeral 11 denotes a power source.

The light input coming from the object to be photographed through the camera objective system is transformed by the photo-diode 1 into a photocurrent $i_1$ which is proportional to the light input intensity. The transistor 2 is self-biased from collector to base through the buffer circuit 4 so that the collector current is equal to the photo-current $i_1$. Accordingly, because of PN-junction diode characteristic, the base emitter voltage $V_1$ of the transistor 2 is proportional to the logarithm of the photocurrent $i_1$ which is proportional to the light input intensity. Therefore, it is clear that, in response to variations in geometrical progression with a common ratio 2 of the object brightness B, the base-emitter voltage $V_1$ varies linearly, and accordingly the voltage variation is proportional to the APEX-represented value $B_V$ of the object brightness B.

The voltage value $V_2$ of the constant-voltage source 3 is so established as to be proportional to $S_V - A_V$, where $S_V$ and $A_V$ are APEX-represented values of film sensitivity value and diaphragm value, respectively. The characteristic of the constant-voltage source 3 is such that the variation of the voltage value $V_2$ in response to the unit amount variation of the value $S_V - A_V$ is equal to the variation of the voltage value $V_1$ in response to the unit amount variation of the value $B_V$. Such constant-voltage source 3 is serially connected to the emitter electrode of the transistor 2. Therefore, the base voltage $V_3$ of the transistor 2 corresponds to the value $B_V + S_V - A_V$, which is, a value corresponding to the APEX-represented value $T_V$ of the exposure time T.

In operation, the collector current-voltage characteristic is a constant-current characteristic, and the voltage value $V_2$ of the constant-voltage source 3 is not influenced by the current $i_1$. Technically, there is no questions as to arranging the circuit to satisfy these conditions.

A timing capacitor 5 is connected to the collector side of the transistor 6. To the emitter side of the transistor 6 a constant-voltage source 7 is connected whose circuit structure is similar to that of the constant-voltage source 3. The voltage $V_3$ at the base of transistor 2 is applied to the base of the transistor 6. The voltage value $V_3$ as described above corresponds to the value $B_V + S_V - A_V$, and is equal to the value $T_V$.

The voltage value $V_5$ of the constant-voltage source 7 is such that the collector current of transistor 6 based on its base-emitter PN junction diode characteristic is obtained as a timing charging current $i_2$ which is previously established for obtaining the necessary exposure time. Therefore, the timing charging current $i_2$ is proportional to the exposure time T. The collector current-voltage characteristic is, of course, of constant-current nature. Further, it is necessary that the diode characteristic due to the base-emitter PN junction of the transistor 6 be equal to that of the transistor 2 and that the voltage value $V_5$ of the constant-voltage source 7 is not influenced by the current $i_2$.

The constant-voltage source 7 is adjustable to enable the transistor 6 to produce the previously established value of timing charging current $i_2$ corresponding to the value $T_V$ based on the voltage value $V_1$ (corresponding to the value $B_V$) provided by the transistor 2 and the voltage value $V_2$ (corresponding to the value $S_V - A_V$) of the constant-voltage source 3. Therefore, the constant-voltage source 7 may be considered as a bias level, adjusting constant-voltage source.

A normally closed-type timing switch 8 is brought from the condition of closed to that of open in synchronism with start of run of the focal plane shutter leading screen. This causes the timing charging current $i_2$ to start to constant-current charge the timing capacitor 5 up to the previously established voltage value. Upon completion of this charging operation, a switching circuit 9 controls, through the action of the magnet 10, the time of start of run of the trailing camera screen, thus providing proper exposure time.

In the aforementioned example, the voltage value $V_2$ of the constant-voltage source 3 is established on the basis of the value $S_V - A_V$. This is not absolutely necessary and the voltages of the constant-voltage sources 3 and 7 can be established with separate values $S_V$ and $A_V$. For example, if the voltage value $V_2$ of the constant-voltage source 3 is established proportional to the value $S_V$ and the voltage value $V_5$ of the constant-voltage source 7 is established corresponding to the value $A_V$, then as the value $V_3$ there is obtained a voltage value corresponding to the value $B_V + S_V = E_V$. Accordingly, the base-emitter voltage $V_4$ of the transistor 6 is of a value corresponding to the value $B_V + S_V - A_V = T_V$, and the collector current $i_2$ of the transistor 6 is of a value which is proportional to the exposure time T corresponding to the value $T_V$.

Figure 2:
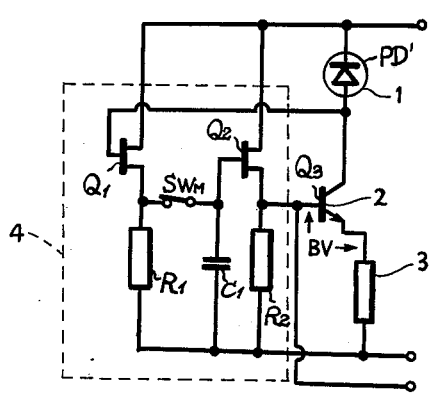
FIG. 2 is a circuit diagram showing one example of high input impedance buffer for use in the structure of FIG. 1.

Refer now to FIG. 2 which shows an embodiment of the high input impedance (i.e. resistance) type buffer circuit 4.

Correspondence of the circuit elements of FIG. 2 to those of the fundamental circuit of FIG. 1 exist as follows: a photo-diode PD and a transistor $Q_3$ correspond to the light receiving element 1 and the transistor 2, respectively. The high input resistance type buffer circuit 4 having a retaining function consists of a source-follower circuit consisting of an FET $Q_1$ and a resistor $R_1$, a switch $SW_M$ and a capacitor $C_1$ (for the retaining function) and a source follower circuit consisting of an FET $Q_2$ and a resistor $R_2$.

The operation of the circuit is as follows: Upon a photographing operation, the light input coming from the object through the camera objective system is transformed into a photocurrent by the light receiving element PD. The base-emitter voltage 3 of the transistor $Q_3$ is automatically controlled so that the collector current of the transistor $Q_3$ is equal to the photocurrent. The high input resistance type buffer circuit (source-follower circuit) consisting of the FET $Q_1$ and the resistor $R_1$ and the retaining circuit having switch $SW_M$, the retaining capacitor $C_1$, the FET $Q_2$ and the resistor $R_2$, biases the collector to the base electrodes of the transistor $Q_3$ so as to carry out the automatic control operation. Accordingly, the base-emitter voltage of the transistor $Q_3$ is of a value corresponding to the value $B_V$.

The above-described circuit structure according to the present invention in an electric shutter control circuit for a single lens reflex camera has very small source voltage dependency and temperature dependency and is stable. The features arising from the above-described structure are as follows: A first circuit with a light receiving element has constant-current photoelectric transformation characteristic and transistors have constant-current collector output characteristic ingeniously combined so that without influence or variation of source voltage and of ambient temperature, control is made in such a manner that the collector current of the transistor is always equal to the photocurrent obtained by the light receiving element. Preferably, a second circuit is provided with a retention function for the first circuit means. A third circuit is provided and characterized in that on the basis of photocurrent, a voltage corresponding to the value $B_V$ is obtained through the diode action of the base-emitter section of the transistor in the first circuit, and in series with the transistor there is connected a constant-voltage source whose voltage value is established in accordance with exposure determining factors. A fourth circuit is characterized in that a transistor provides timing charging current corresponding to the value $T_V$ which is proportional to exposure time through the diode action of the base-emitter section of the transistor and there is serially connected a constant-voltage source whose voltage value is determined through the setting of the D.C. operating point for the operation or in accordance with exposure determining factors. A fifth circuit is characterized in that the circuits of the transistors and the constant-voltage sources with the objects and structures as adopted by the second and the third circuits are parallely connected together so that photographic computation is carried out on the basis of APEX indexes and the resulting timing charging current corresponding to exposure time is obtained in stable condition without the influence or variations of the source voltage and of the ambient temperature by means of compensation.

As described above, according to the present invention, the defect in conventionally utilized light receiving elements such as CdS element is eliminated by utilizing a light receiving element of constant-current nature such as a silicon photo-diode. It is not necessary to provide a special circuit for compensating for variations in source voltage and temperature which compensation has been required in especially strict manner in electric shutter control circuits having logarithmic compression → photographic linear computation → logarithmic expansion. The circuit structure for the fundamental processes is of such structure that the dependencies compensate each other so that there can be obtained an electric shutter control circuit of very high stability and high accuracy with simple circuit structure.

Figure 3:
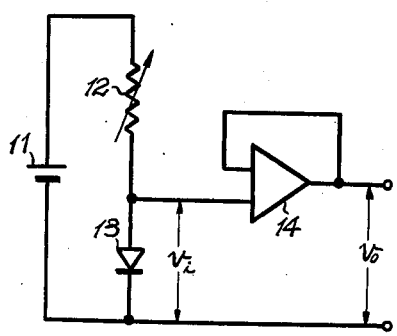
FIG. 3 is a circuit diagram showing one example of the constant-voltage source for use in the structure of FIG. 1.

FIG. 3 illustrates an embodiment for actual realization of the constant-voltage sources 3 and 7 as shown by FIG. 1. A serial circuit consists of a variable resistor 12 and a serial connected logarithmic conversion element 13 in the form of a diode. The logarithmic conversion element 13 may be a semi-conductor diode or any other semi-conductor element having a PN junction to thereby provide an exponential current-voltage characteristic. The exponential characteristic provides the logarithmic conversion. The value of the variable resistor 12 is established in accordance with exposure determining factors such as lens aperture value A and film sensitivity S or the biasing requirement for the other circuit operation. The resistance value of the variable resistor 12 determines the current value flowing through the logarithmic conversion element 13. As a result, a voltage $V_i$ proportional to the logarithmic value of the current value appears across terminals of the logarithmic conversion element 13. The resistance characteristic of the variable resistor 12 is established in accordance with the logarithmic conversion characteristic of said logarithmic conversion element 13 so that said voltage $V_i$ may be obtained in proportion to $S_v - A_v$ of the APEX-represented values $A_v$ and $S_v$ of the lens aperture value A and the film sensitivity S. An operational amplifier 14, having a feedback from output to one input, is connected to the side of the diode at which V appears and forms a voltage follower circuit for the voltage $V_i$. Therefore, the output voltage $V_o$ of the voltage follower circuit 14 is equal to the input voltage $V_i$ and therefore proportional to the value $S_v - A_v$. The output voltage $V_o$ forms the voltage $V_2$ of constant-voltage source 3 and $V_5$ of constant-voltage source 5. The voltage $V_o$ is maintained equal to the input voltage $V_i$ without being influenced by external factors such as the emitter current of the transistor 2 or 6, since the voltage follower circuit has its peculiar characteristic that the input resistance is very high and the inner resistance on the output terminal is very low.

It will be apparent that the output voltage $V_o$ of the voltage follower circuit is proportional to $A_v$ or $S_v$ when voltage $V_i$ is to be established proportional to $A_v$ or $S_v$, separately.

What is claimed is:

1. An electric shutter control circuit for a single lens reflex camera comprising:

a. first and second circuit sections, each comprising:
   a transistor having an emitter-collector electrode circuit having first and second sides and a base electrode circuit,
   a constant-voltage source having first and second sides, the first side being coupled to a first side of the emitter-collector electrode circuit of said transistor, wherein said constant voltage source comprises the serial connection of a variable resistor and means providing a logarithmic function output, and an operational amplifier responsive to said logarithmic function output for providing between said first and second sides said constant-voltage independent of current therethrough;
b. current controlling photosensitive means coupled to a first side of the emitter-collector electrode circuit of the transistor in the first circuit section for controlling the amount of current through such transistor corresponding to the intensity of received light;
c. a bias circuit responsive to the current from said photosensitive means for applying a corresponding bias current to the base electrodes of both transistors in both said circuit sections;
d. a capacitor having first and second sides, the first side being coupled to the second side of the emitter-collector electrode circuit of the transistor in the second circuit section, enabling such transistor to provide a constant-current charge to the capacitor; and
e. means for providing a source of potential across the second sides of said photosensitive means and said constant-voltage source of said first circuit section and a source of potential across said second sides of said capacitor and constant-voltage source of said second circuit section;
f. the variable resistor in at least one of the circuit sections being arranged to provide an adjustable signal corresponding to photographic determining factors.

2. An electric shutter control circuit according to claim 1 wherein the bias circuit comprises a circuit having an input and output, the input being coupled to the second side of the emitter-collector electrode circuit of the first circuit section and the output being coupled to the base electrode of the transistor in said first circuit section, the circuit of said bias circuit being characterized by a high input impedance at said input so as to have negligible effect on current at the second side of the emitter-collector electrode circuit and comprising a storage means for retaining the signal on the base electrode of the transistor in the first circuit section and thereby maintain a constant collector-emitter current in the first circuit section.

3. An electric shutter control circuit according to claim 2 wherein the output of said circuit of said bias circuit is also coupled to the base electrode of the transistor in said second circuit section.

4. An electric shutter control according to claim 3 wherein said circuit of said bias circuit comprises means for disconnecting the storage means from the collector-emitter electrode circuit of the transistor in the first circuit section.

5. An electric shutter control circuit according to claim 4 wherein the storage means comprises a capacitor and comprising switch means having a first state for preventing charging current from passing through said capacitor and a second state for allowing charging current to pass therethrough.

6. An electric shutter control circuit according to claim 1 wherein said constant-voltage source comprises a resistor and a diode serially connected together and an amplifier having an input and an output, said input being coupled to said diode, the output of the amplifier comprising one of said first and second sides of said constant-voltage source and the side of the diode which is opposite from said resistor comprising the other side of said constant-voltage source, the amplifier having a feedback circuit from output to input enabling said amplifier to produce across the first and second sides of said constant-voltage source a constant-voltage output corresponding to the signal across said diode.

7. An electric shutter control circuit for a single lens reflex camera comprising:
   a. first and second mutually independent circuit sections, each comprising:
      a transistor;
      a constant-voltage source having first and second sides, the first side being coupled to the emitter electrode of said transistor, said constant-voltage source comprising a series circuit comprising a resistor and a diode serially connected together and an amplifier having an input coupled to said diode, the output of said amplifier comprising the constant-voltage circuit first side and the side of the diode opposite from the resistor comprising the constant-voltage circuit second side, said amplifier having a feedback circuit from output to input thereof enabling said amplifier to produce a constant-voltage output between first and second sides of said constant-voltage source corresponding to the signal across said diode;
   b. current controlling photosensitive means having first and second sides, the first side being coupled to the collector electrode of said transistor of the first circuit section for controlling the amount of current therethrough corresponding to the intensity of received light;
   c. a bias circuit responsive to the current from said photosensitive means for applying a corresponding bias current to the base electrodes of both transistors in both said circuit sections, causing a voltage from base to emitter electrodes of the transistor in said first section which corresponds to intensity of the received light;
   d. a capacitor having first and second sides, the first side being coupled to the collector electrode of the transistor in the second circuit section enabling such transistor to provide a constant-current charge to the capacitor;
   e. a source of potential; and
   f. means for connecting one of two sides of the source of potential to the second sides of said photosensitive means and said capacitor and to the side of said resistor opposite from said diode and for coupling the other side of said source of potential to the first sides of said constant-voltage sources and to the other side of said diode from said resistor;
   g. the resistor of at least one of the circuit sections being adjustable so as to provide an adjustable signal corresponding to photographic determining factors.

8. In a single lens reflex camera an electric shutter control circuit having a trailing camera screen comprising:
   a. first and second circuit sections, each comprising:
      a transistor having an emitter-collector electrode circuit having first and second sides and a base electrode circuit, and
      a constant-voltage source having first and second sides, the first side being coupled to a first side of the emitter-collector electrode circuit of said transistor, wherein said constant-voltage source comprises the serial connection of a variable resistor and means providing a logarithmic function output, and an operational amplifier responsive to said logarithmic function output for providing between said first and second sides said constant-voltage independent of current therethrough;
   b. current controlling photosensitive means coupled to a first side of the emitter-collector electrode circuit of the transistor in the first circuit section for controlling the amount of current through such transistor corresponding to the intensity of received light;
   c. a bias circuit responsive to the current from said photosensitive means for applying a corresponding bias current to the base electrodes of both said transistors in both said circuit sections;
   d. a capacitor having first and second sides, the first side being coupled to the second side of the emitter-collector electrode circuit of the transistor in the second circuit section, enabling such transistor to provide a constant-current charge to the capacitor;
   e. means for providing a source of potential across the second sides of said photosensitive means and said constant-voltage source of said first circuit section and a source of potential across said second sides of said capacitor and constant-voltage source of said second circuit section;
   f. switch means having a first state for preventing charging current from passing through said capacitor and a second state for allowing charging current to pass therethrough; and
   g. means responsive to the signal at the emitter-collector circuit of the transistor in said second circuit section for effecting a control of the trailing camera screen in the camera.

9. An electric shutter control circuit for a single lens reflex camera comprising:
   a. first and second mutually independent circuit sections, each comprising
      a transistor, and
      a constant-voltage source having first and second sides, the first side being coupled to the emitter electrode of said transistor and the source providing a constant-voltage thereacross independent of applied current between the first and second sides, said constant-voltage source comprising a resistor and a diode serially connected together and an amplifier having an input and an output, said amplifier input being coupled to said diode, the output of said amplifier comprising one of said first and second sides of said constant-voltage source and the side of the diode which is opposite from said resistor comprising the other side of said constant-voltage source, the amplifier having a feedback circuit from output to input enabling said amplifier to produce across the first and second sides of said constant-voltage source a constant-voltage ouput corresponding to the signal across said diode;

b. current controlling photosensitive means having first and second sides, the first side being coupled to the collector electrode of said transistor of the first circuit section for controlling the amount of current therethrough corresponding to the intensity of received light;

c. a bias circuit responsive to the current from said photosensitive means for applying a corresponding bias current to the base electrodes of both transistors in both said circuit sections, causing a voltage from base to emitter electrodes of the transistor in said first section which corresponds to intensity of the received light;

d. a capacitor having first and second sides, the first side being coupled to the collector electrode of the transistor in the second circuit section enabling such transistor to provide a constant-current charge to the capacitor; and e. means for providing a source of potential across the second sides of said photosensitive means and said constant-voltage source of said first circuit section and a source of potential across said second sides of said capacitor and constant-voltage source of said second circuit section;

f. the constant-voltage source of at least one of the first and second circuit sections comprising controllable means for adjusting the constant-voltage proportional to the logarithmic compression of a photographic exposure determining factor.

* * * * *